United States Patent [19]

Chupp

[11] 4,017,185
[45] Apr. 12, 1977

[54] OPTICAL ARRANGEMENTS FOR COUPLING MONOCHROMATORS WITH EXTERNAL SYSTEMS

[75] Inventor: Vernon L. Chupp, Los Altos, Calif.

[73] Assignee: Varian Associates, Palo Alto, Calif.

[22] Filed: May 12, 1975

[21] Appl. No.: 576,273

Related U.S. Application Data

[62] Division of Ser. No. 453,826, March 22, 1974, Pat. No. 3,936,191.

[52] U.S. Cl. .................................. 356/96; 356/99; 356/101
[51] Int. Cl.² ........................................... G01J 3/02
[58] Field of Search ..................... 356/88, 93–97, 356/99–101

[56] References Cited

UNITED STATES PATENTS 3,575,511   4/1971   Francis ............................... 356/99
3,748,040   7/1973   Howes ............................... 356/101

Primary Examiner—John K. Corbin
Assistant Examiner—F. L. Evans
Attorney, Agent, or Firm—William W. Haefliger

[57] ABSTRACT

External coupling optics, including a spherical mirror, is located in the beam path between a curved slit and a detector for imaging the slit onto the detector; alternatively, the beam path is between a light source and the slit for imaging the slit onto the source; alternatively, the beam path is between the slit and a sample cell for imaging the slit onto the cell.

8 Claims, 15 Drawing Figures

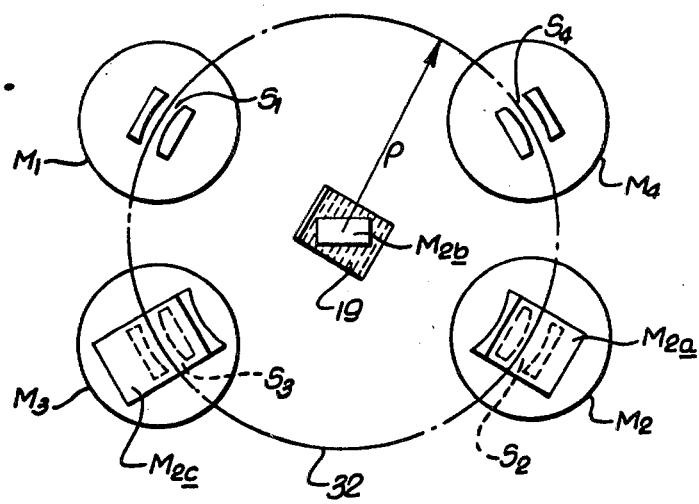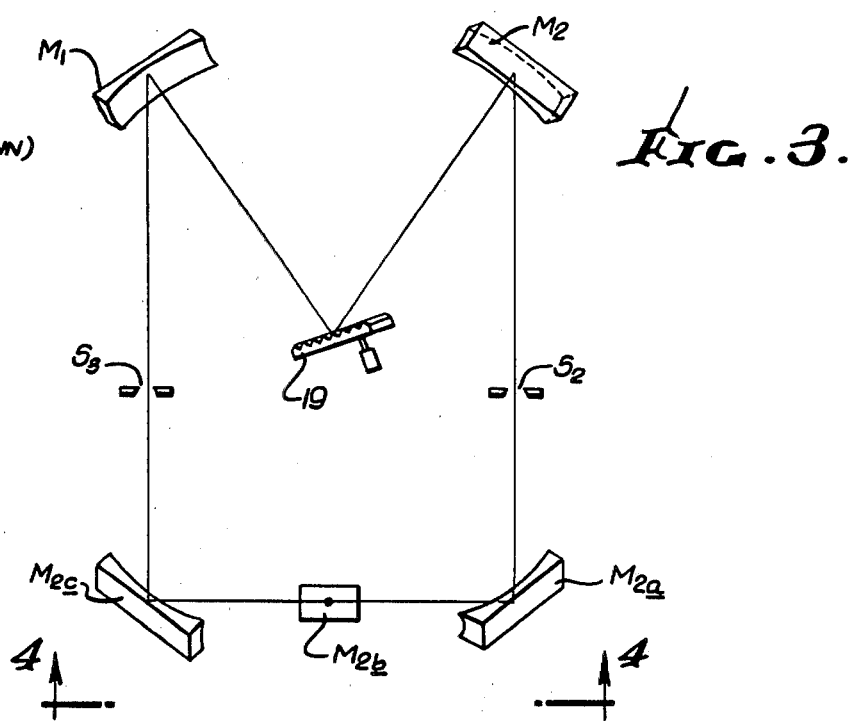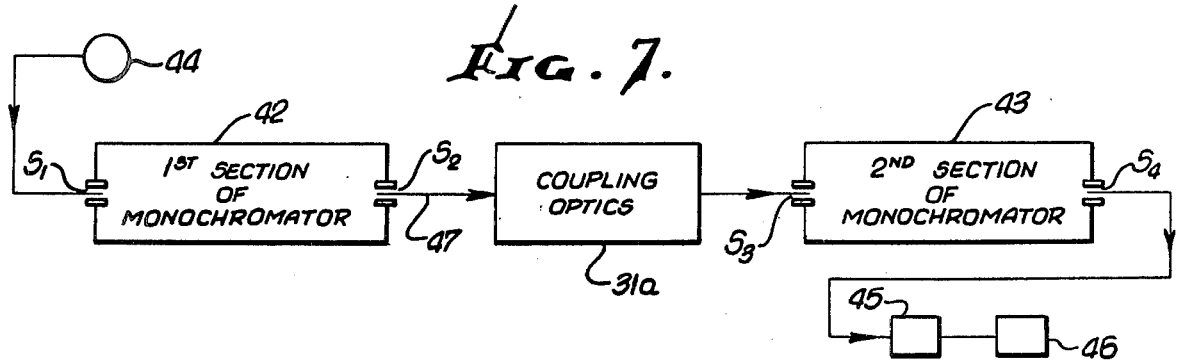

FIG. 5.
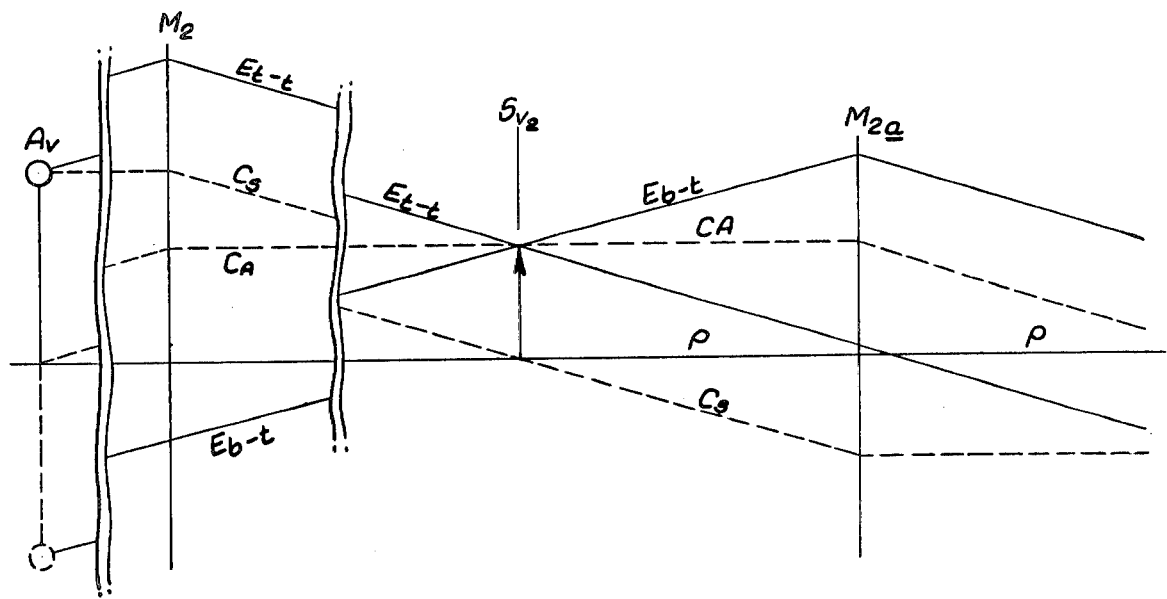
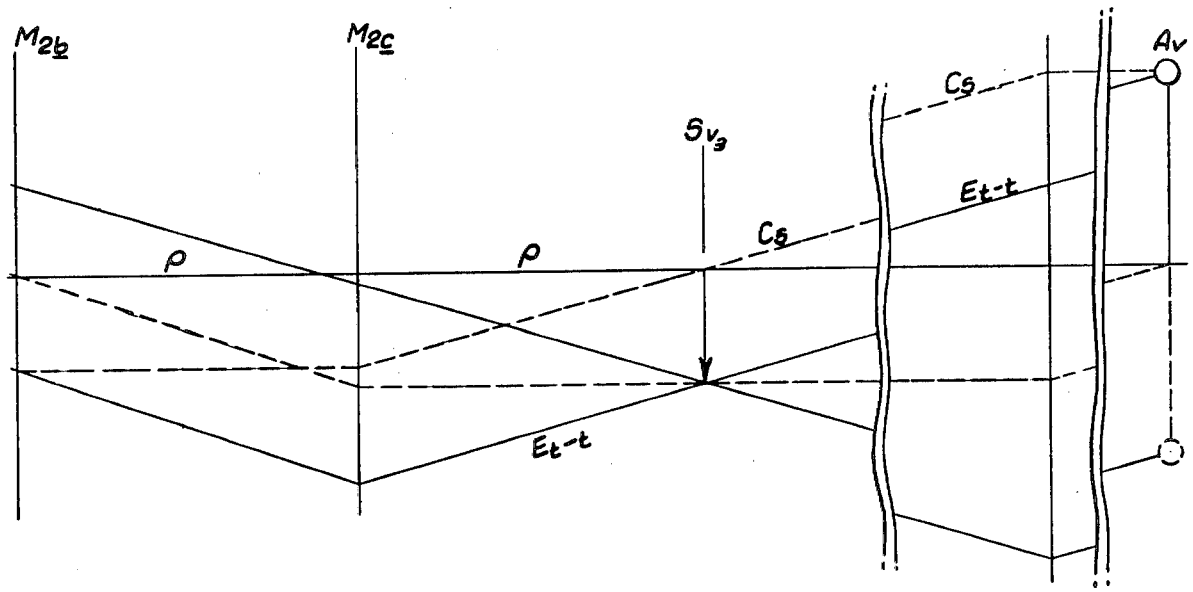

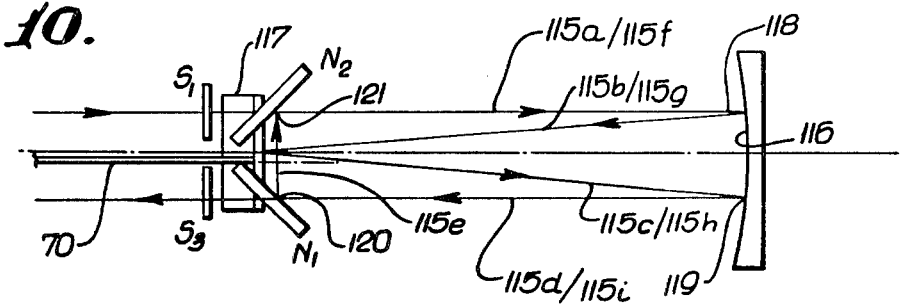
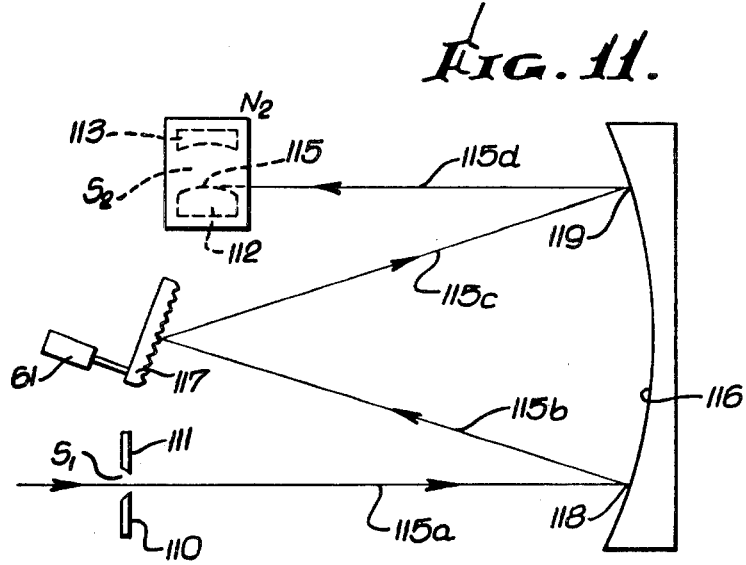
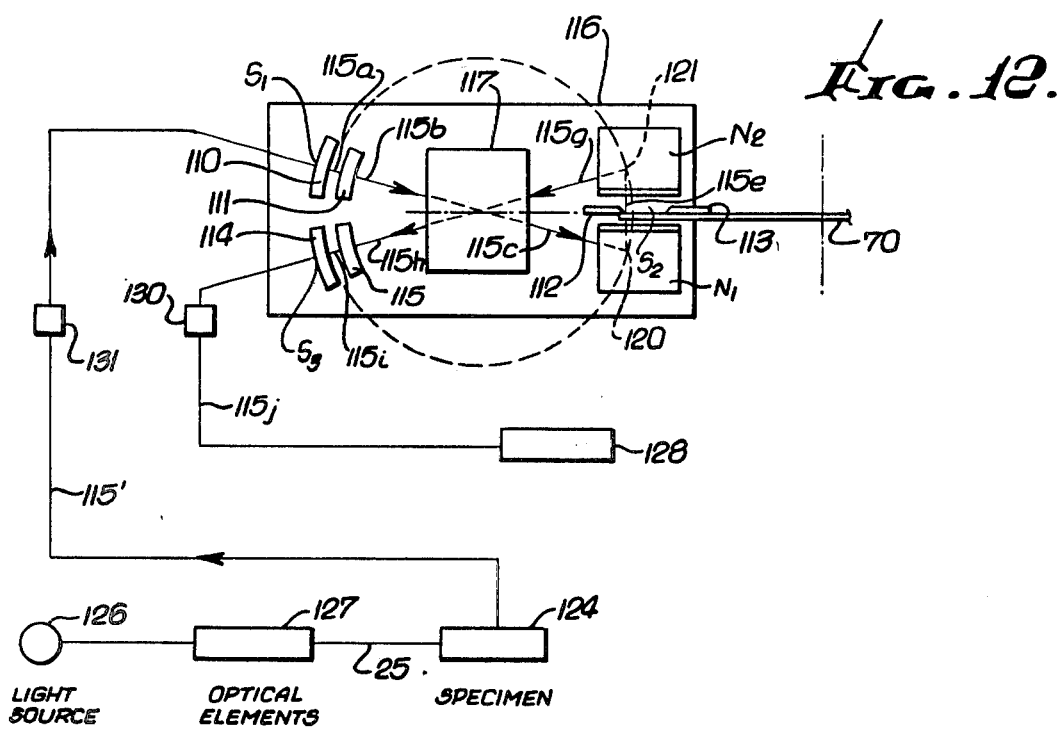

OPTICAL ARRANGEMENTS FOR COUPLING MONOCHROMATORS WITH EXTERNAL SYSTEMS

This is a division of application Ser. No. 453,826 filed Mar. 22, 1974, now U.S. Pat. No. 3,936,191.

BACKGROUND OF THE INVENTION

This invention relates generally to spectrophotometry, and more particularly concerns advancements in optical coupling to monochromators and between monochromator sections.

To facilitate understanding the invention and distinguishing if from prior art, it is necessary to define certain terms. A monochromator can be viewed as an optical filter. A double monochromator, then, is a system which causes the radiation to be twice filtered. The advantages of the double monochromator over the single monochromator are improved spectral purity and resolution. In this context, a monochromator stage is defined as a set of optical elements, including dispersing means such as a grating, necessary to receive light from one slit, render it incident to the dispersing means, and finally pass it through another slit. A double monochromator then can be either a system which passes the radiation once through two separate monochromator stages or a system which passes the radiation twice through a single monochromator state. The latter type are frequently referred to as double-passing monochromators. The advantage of the double-passing monochromator over the two stage monochromator is largely economic. It is generally a more compact system and results in fewer essential expensive optical and mechanical components. Also, the engineering problems of tracking the two monochromator sections to the desired accuracy are substantially reduced.

A further complication exists in that in either type of double monochromator, the optics can be arranged so that the dispersion of the second section either adds to or tends to subtract from the dispersion of the first section. In the subtractive dispersion arrangement, because of the bandwidth limit imposed by the intermediate slit, the resultant total dispersion is equal to that of a single monochromator whereas the total resultant dispersion of the additive arrangement is twice that of the single monochromator. Since the amount of light flux passed for a given resolution is proportional to dispersion, for most applications the preferred embodiment is additive dispersion.

In the past, the achievement of desired monochromator efficiency has been limited by a number of factors. For example, in the case of additive dispersion double-pass monochromators, with intermediate slits located at the monochromator side of the plane or planes of the entrance and exit slits, bands of unwanted radiation are efficiently transmitted, requiring filters or selective detectors for avoiding or reducing response to such radiation bands and consequent spurious and misleading signals. See for example U.S. Pat. No. 2,922,331 to Fastie.

External slit-coupling arrangements (and some internal ones as well) have produced serious mismatch of the curvature of the exit slit of the first section as imaged upon the entrance slit of the second section. Consequently, all such arrangements described have used very short slits so that resolution is not seriously deteriorated, with the result that the "light grasp" (or "throughput", or "etendue"), i.e. the amount of light flux that can be passed for a given resolution, is seriously limited. For illustrations of these arrangements, see U.S. Pat. Nos. 2,922,331 and 3,567,323.

SUMMARY OF THE INVENTION

It is a major object of the invention to provide solutions to these problems and difficulties through the provision of coupling optics external to a monochromator, or two monochromator sections, and capable of imaging an exit or entrance slit onto an entrance or exit slit, respectively, or upon a radiation beam source, sample cell or detector, in an unusually advantageous manner as will be seen.

One application of the invention is to an additive dispersion, double-passed monochromator which incorporates an entrance slit $S_1$, intermediate slits $S^2$ and $S_3$ and exit slit $S_4$, the slits having equal curvature and located on the circumference of a circle commonly known as the Ebert circle. Such a monochromator also includes a beam dispersing means in the beam path between $S_1$ and $S_2$, and between $S_3$ and $S_4$, and defining an aperture stop, and appropriate mirror means to reflect the beam in its path between $S_1$ and $S_2$, and between $S_3$ and $S_4$. The improved coupling optics external to the monochromator images $S_2$ onto $S_3$, and also reimages the aperture stop back on itself, for purposes and in the manner to be described. In this regard, the coupling optics may with unusual advantage comprise two spherical mirrors each of radius $\sqrt{2}\,\rho$ where $\rho$ equals the radius of the Ebert circle defined by the slits, and an off-axis, positive power cylindrical mirror located between the two spherical mirrors. In this regard, the spherical mirrors have centers at or near the center of the center of the Ebert circle.

Another aspect of the invention concerns its application to a single monochromator to couple entrance slit $S_1$ to a light source, an external spherical mirror being used for this purpose, the mirror having its center at the center of the Ebert circle, such a mirror also being usable to couple exit slit $S_2$ to a detector or to a sample cell. Also, the spherical mirror has a radius equal to $\sqrt{2}\,\rho$. In this regard, such spherical mirror coupling aspects of the invention also have similar application to a subtractive dispersion, double monochromator, as will be seen.

These and other objects and advantages of the invention, as well as the details of illustrative embodiments, will be more fully understood from the following description and drawings, in which:

DRAWING DESCRIPTION

FIG. 3 is an elevation like FIG. 1, but taken on lines 3—3 of FIG. 2;

FIG. 4 is an end view taken on lines 4—4 of FIG. 3;

FIG. 5 is an optical ray diagram of a system to couple a FIGS. 1-4 type monochromator exit slit (first pass) to an entrance slit (second pass), and taken in a horizontal viewing direction;

FIG. 7 is a block diagram of another double pass monochromator, with associated external coupling optics embodying the invention;

FIG. 10 is a side elevation of a subtractive dispersion double monochromator;

FIG. 11 is a top plan view of the FIG. 10 monochromator;

FIG. 12 is an end elevation of FIG. 10 subtractive dispersion double monochromator, with external coupling optics;

DETAILED DESCRIPTION

Figure 2:
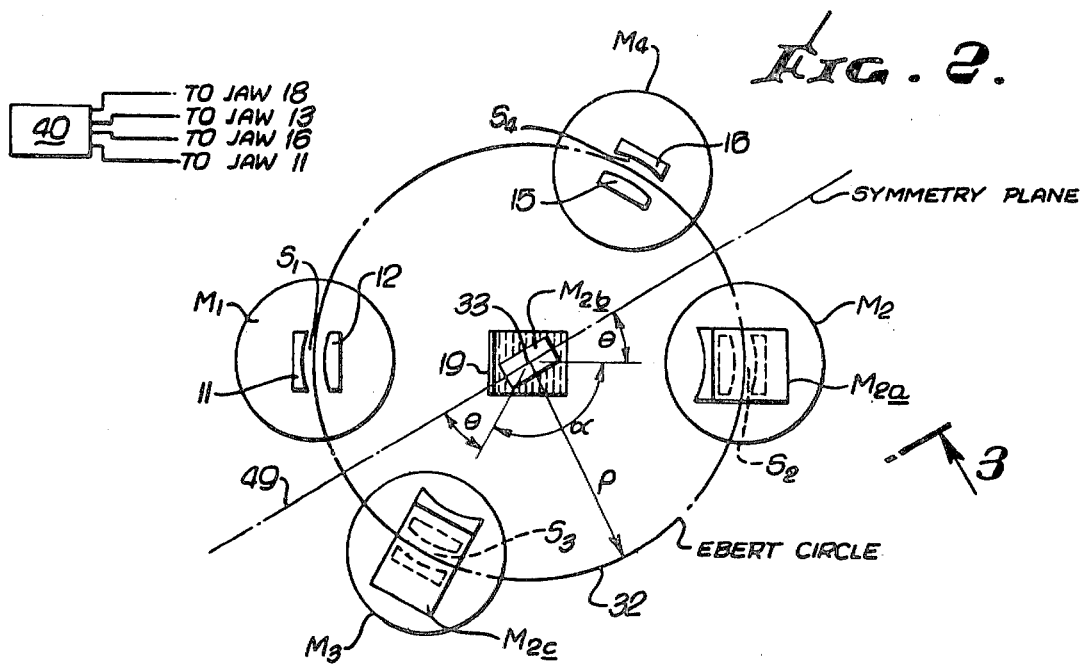
FIG. 2 is an end view of the FIG. 1 monochromator on lines 2—2 of FIG. 1.

Referring first to FIGS. 1–4, a monochromator 10 includes means (as for example jaws 11–18) forming an entrance slit $S_1$, intermediate slits $S_2$ and $S_3$, and an exit slit $S_4$. A dispersing means, as for example grating 19, is located in the path of a beam passing between slits $S_1$ and $S_2$, and also between slits $S_3$ and $S_4$, the grating defining an aperture stop. Further, mirror means, as for example mirror sections $M_1$–$M_4$ are provided to reflect the beam for passage between the slits $S_1$ and $S_2$ with dispersion by grating 19, and to reflect the beam for passage between slits $S_3$ and $S_4$ with dispersion by that grating. The grating as shown is characterized by additive directions of dispersion in the successive monochromator sections, the first of which is associated with the beam path between $S_1$ and $S_2$, and the second of which is associated with the beam path between slits $S_3$ and $S_4$. The complete beam path is shown in principal ray form (central ray path at nominal wavelength) as including ray 20a passing from the light source 21 to mirror $M_1$ for reflection at 22, ray 20b passing from $M_1$ to grating 19 for dispersion, ray 20c passing from the grating to mirror $M_2$ for reflection at 23, ray 20d passing from $M_2$ through intermediate slit $S_2$ to external mirror $M_{2a}$, ray 20e reflected at 24 from $M_{2a}$ to off-axis cylindrically concave mirror $M_{2b}$, ray 20f reflected at 25 from $M_{2b}$ to mirror $M_{2c}$, ray 20g reflected at 26 from $M_{2c}$ to re-enter the monochromator via intermediate slit $S_3$, ray 20h reflected by mirror $M_3$ at 27 toward the same portion of grating 19, for further dispersion, ray 20i passing from the grating 19 to mirror $M_4$ for reflection at 28, and ray 20j reflected from $M_4$ to exit the monochromator via slit $S_4$. Ray 20j may be directed through a sample containing cell 29 and to detector 30. Rays 20a–20d may be considered as first pass rays, while rays 20g–20j may be considered as second pass rays. Mirrors $M_1$–$M_4$, shown as separate, may lie on one large spherical surface whose center lies outside the monochromator but on the line 35 which bisects the angle β between principal rays 20b and 20c, or β' between rays 20h and 20i. Line 35 is normal to the grating when the latter is in zero order position, or position in which it acts as a mirror. Each section of the monochromator is symmetrical about this line, and the principal entering and exiting rays lie parallel to it, in the arrangement first described by Ebert.

It is a feature of the invention that the external coupling optical means, generally indicated at 31, are located in the path of the beam between slits $S_2$ and $S_3$ for accurately imaging slit $S_2$ onto $S_3$ throughout any desired spectral range, these slits being curved as are slits $S_1$ and $S_4$. FIG. 2 shows slits $S_1$–$S_4$ located on the Ebert circle 32 the center of which appears at 33, and the radius being indicated at ρ. Further, the external coupling optic system reimages the aperture stop (or grating) back on itself so as to reduce vignetting and improve throughput, even at large grating angles from the central or "mirror" position. This is accomplished by making each of the external mirrors $M_{2a}$ and $M_{2c}$ spherical, with radii $r_1 = r_2 = \sqrt{2}\,\rho$, and with a common center at 33, which is the center of Ebert circle 32. When this is done, the curved slit $S_2$ will be rendered as a straight line image lying in the section normal to the axis of the beam and in a plane parallel to the plane of the slits. Actually, the straight line image is a horizontal slit image coincident with a vertical aperture (grating) image, the location of the vertical slit image approaching infinity in the optical space between $M_{2a}$ and $M_{2c}$. Since the same thing would happen in reversed light from the entrance slit $S_3$ of the second monochromator, these two images can be made to coincide, except for the angle of asymmetry of the two sections of the monochromator. A flat mirror parallel to the plane of symmetry between the two sections of the monochromator, would therefore turn the image of $S_2$ directly into coincidence with $S_3$. Such a flat mirror, however, acting in conjunction with mirror $M_{2a}$ would not modify the position of the horizontal image of the aperture stop in the system, which must fall between mirrors $M_{2a}$ and $M_{2b}$. This image would therefore not be conjugate with the grating on the second pass, and light would be lost off the grating by "vignetting" in the horizontal dimensions if nothing were done about it. This is because it is a property of a spherical mirror that when used off-axis at 45° (90° between the central rays of the beams) as are mirrors $M_{2a}$ and $M_{2c}$, it has twice as much optical power in the horizontal section (that is, the sections containing the central rays) as in the vertical section. The horizontal power is equal to the power of the mirror used on-axis, divided by the cosine of 45°, or times $\sqrt{2}$, while the vertical power is equal to the on-axis power multiplied by the cosine of 45° or divided by $\sqrt{2}$. (Note: the "power" of a lens or mirror equals the reciprocal of its focal length.)

There are various possibilities for handling this problem. For example, positive lenses whose axes are parallel to their respective slits, as shown in section in FIG. 13, could be located near both slits and could cause the first aperture stop image to lie half way between the slit and mirror $M_{2a}$ in this "horizontal" section. The beam would then be collimated between mirrors $M_{2a}$ and $M_{2c}$. If the cylindrical lenses were sufficiently close to the slits they would not interfere with the slit imaging, so it would be unchanged. Such an arrangement would, however, have the great drawback that such lenses would have to be achromatic or made of different materials for different spectral ranges.

Figure 6:
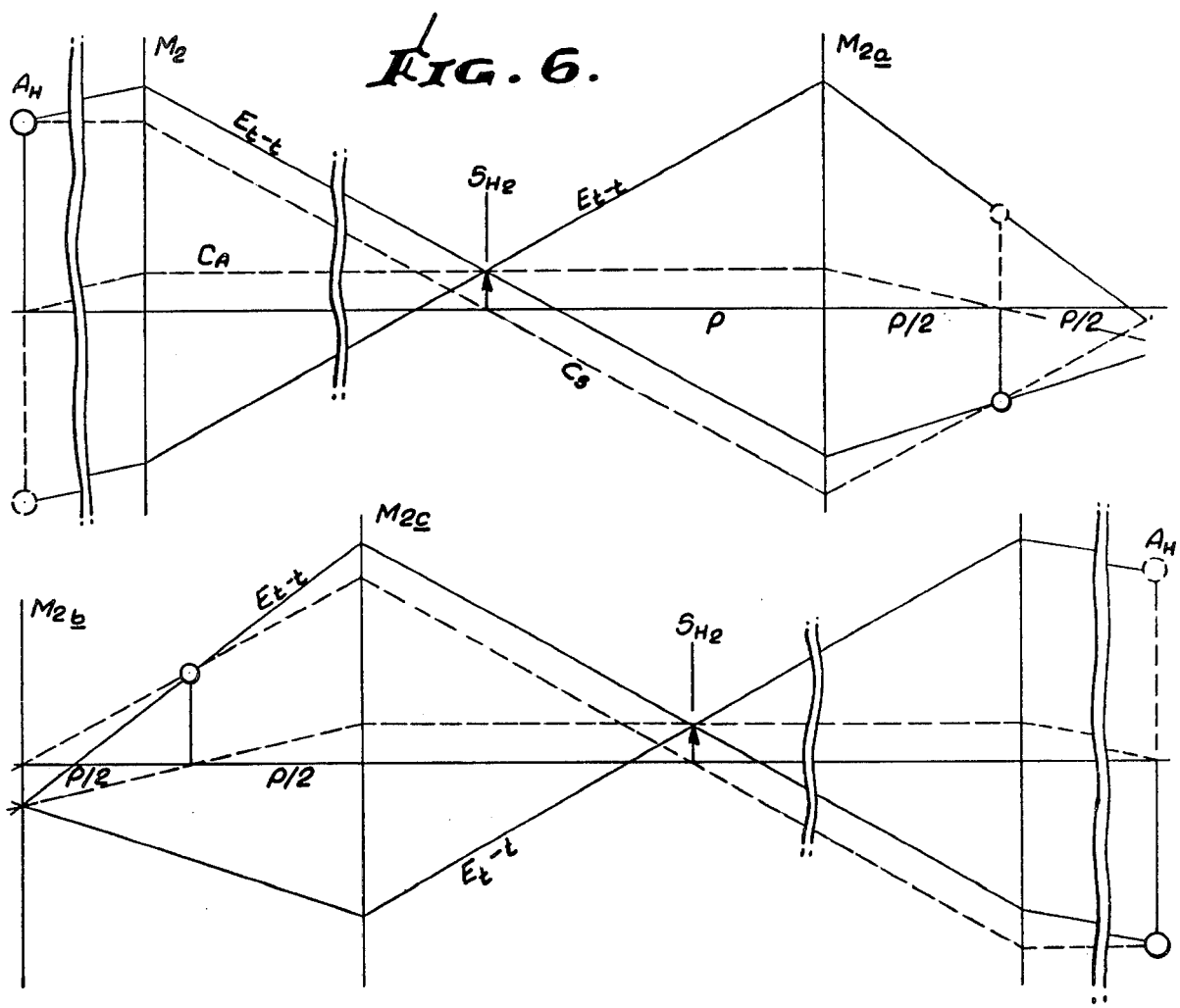
FIG. 6 shows the FIG. 5 ray diagram in a vertical viewing direction.

A simpler solution to this problem consists in using a positive power cylinder $M_{2b}$ instead of the flat mirror, midway between mirrors $M_{2a}$ and $M_{2c}$. This cylinder has sufficient power to produce an image of the aperture stop the same distance from mirror $M_{2c}$ that the first image is from mirror $M_{2a}$. In other words, it makes the system symmetrical both horizontally and vertically, and uses only mirrors, with their well known advantage of equal optical power at all wavelengths. Since the central mirror $M_{2b}$ is located at the horizontal slit image, and has no vertical power, it does not significantly modify the imaging properties of the slit. See in these regards the optical schematics of FIGS. 5 and 6.

It is a fortunate happenstance that in the "vertical" section (perpendicular to the plane of FIG. 1) the image of the aperture stop (the grating), which is ordinarily at or close to infinity when viewed from the exit slit looking into the monochromator, coincides with the horizontal image of the slit. This not only reduces the size of the beam at mirror $M_{2b}$, so the latter can be relatively small, but it also renders the vertical imaging symmetrical.

So far as I can determine, this combination of 45 degree off-axis angles and mirror spaced by $\rho$ from the slits with radius equal to $\sqrt{2}\,\rho$ gives superior image quality to that of any other combination of parameters.

An equation relating the radius of the cylindrical mirror $M_{2b}$ to $\rho$ is as follows: $R = \rho/2 \cdot \cos(90° - \theta) = \rho/2 \cdot \sin\theta$ Actually, I have found that the radius calculated in this way is so small that appreciable aberration of the slit image occurs. Consequently, I prefer to increase the radius of the cylindrical mirror as much as three-fold from that given by this formula. In this case there is some vignetting and consequent loss of energy due to "spill over" at the grating on the second pass, but this is not serious, and in fact even at wide slits gives about 80% of the signal that would otherwise be obtained, while substantially improving the resolution.

Figure 1:
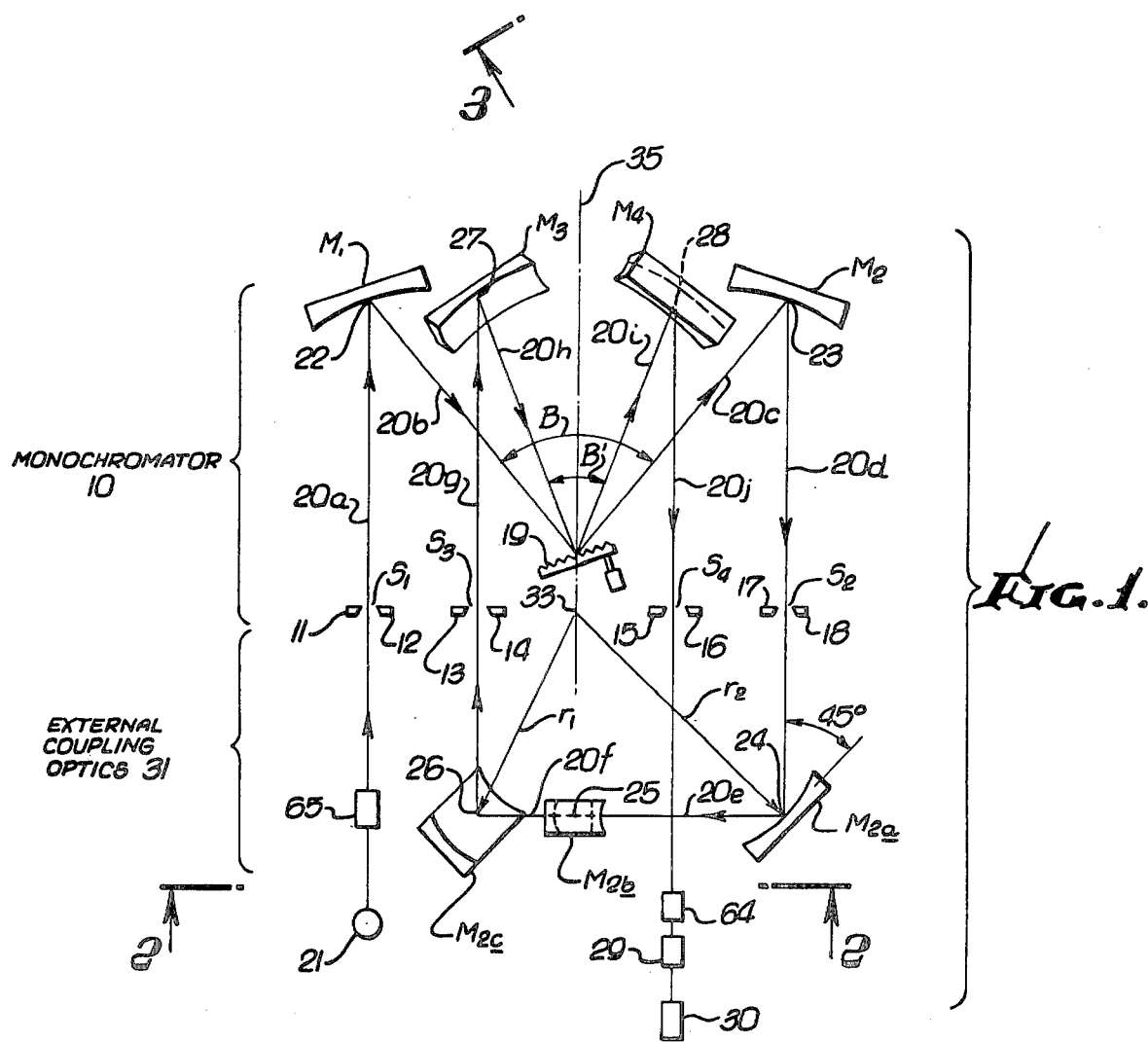
FIG. 1 is a schematic elevation showing an additive dispersion, double monochromator with external coupling optics, embodying the invention.

Note in FIG. 2 that the axis of mirror $M_{2b}$ is parallel to the symmetry plane 49, and that planes normal to the plane of FIG. 2 and passing through rays 20e and 20f extend at angles $\theta$ relative to plane 49. In FIG. 1, the mirror $M_{2a}$ and $M_{2c}$ have 45° off-axis angularity, as shown for $M_{2a}$. The image of the aperture stop is slightly rotated with respect to the orientation of the gratings on the second pass through the monochromator. Also, it may be somewhat too narrow if the radius for the mirror $M_{2b}$ calculated by the above relation is used. These effects in combination provide further justification for using a somewhat larger than theoretical radius for the cylindrical mirror. The grating can then be completely filled with radiation and thus improve resolution. A slit varying mechanism is indicated at 40 in FIG. 2, as connected with jaws 11, 16, 13 and 18, for example.

FIGS. 2 and 4 also illustrate the manner in which spectral overlap is eliminated; that is, that the grating is rotated about its normal so that the rulings are intentionally not perpendicular to the symmetry plane of the two monochromator sections. In other words, one pass of the monochromator uses the grating in plane, and the other pass out-of-plane. In FIGS. 1–4, the grating is oriented so that the rulings are rendered parallel to the tangents of the Ebert Circle at the center of slits $S_1$ and $S_2$ and at an angle of $2\theta$ relative to the tangents of the Ebert circle at the center of slits $S_3$ and $S_4$.

FIG. 7 schematically shows physically separated monochromators, or monochromator sections, indicated at 42 and 43, with a light source 44, sample compartment 45 and detector 46. Coupling optics 31a, corresponding to coupling optics 31, is located in the path of beam 47 passing between sections 42 and 43, for imaging $S_2$ onto $S_3$, as previously described. Monochromator section 42 contains entrance and exit slits $S_1$ and $S_2$, and section 43 contains entrance and exit slits $S_3$ and $S_4$.

Figure 14:
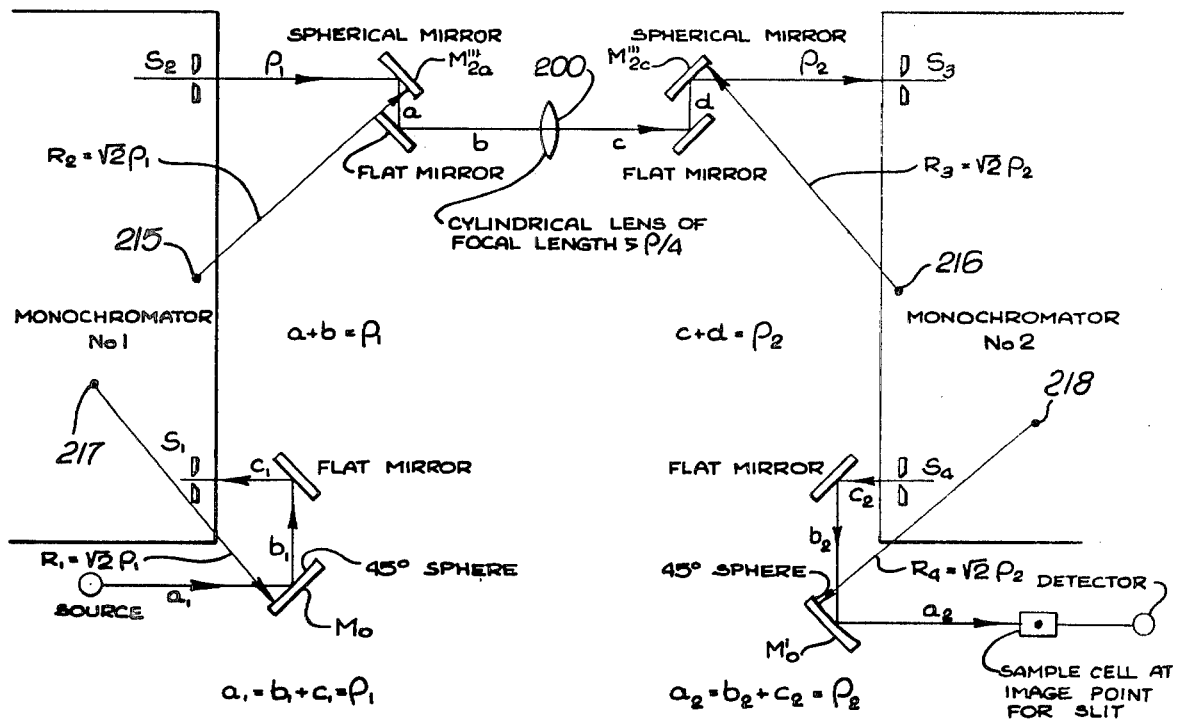
FIGS. 14 and 15 are views showing coupling of separate monochromators.
Figure 15:
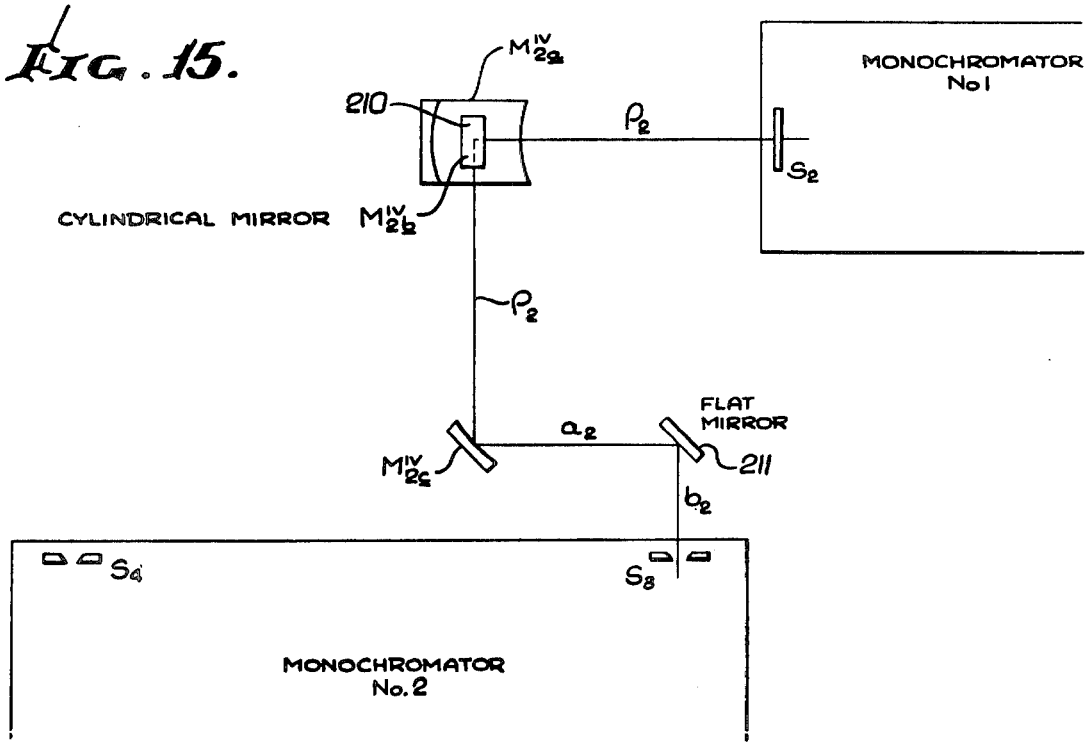

FIGS. 14 and 15 are views showing arrangements coupling two monochromators. In FIG. 14, a cylindrical lens 200 is located at the mid-point, whereas in FIG. 15, a cylindrical mirror 210 is employed.

Figure 8:
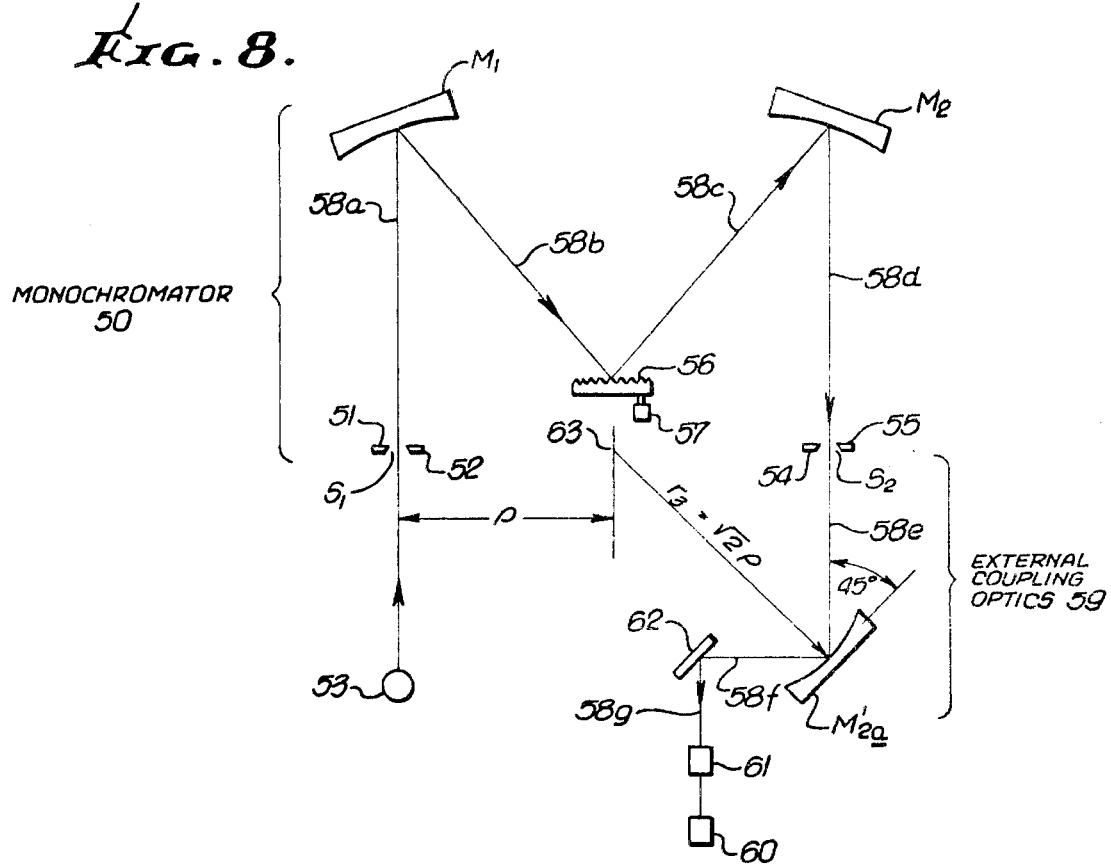
FIG. 8 is a schematic elevation showing a single monochromator with external optics coupling the exit slit to a sample chamber or detector.

Referring to FIG. 8, it shows a single monochromator 50 having jaws 51 and 52 forming an entrance slit $S_1$ to receive a light beam from source 53, and jaws 54 and 55 forming an exit slit $S_2$. The two slits are curved, and lie on or define an Ebert circle. Dispersing means such as grating 56 lies in the beam path between the slits, a drive for the grating being shown at 57. Mirror means to reflect the beam for passage between the slits via the dispersing means includes mirror sections $M_1$ and $M_2$. The corresponding rays are indicated at 58a–58d.

External coupling optical means 59 includes a spherical mirror $M_{2a}'$ located in the beam path between slit $S_2$ and detector 60, a sample cell 61 also being shown in that beam path (indicated by rays 58e, 58f and 58g). Flat mirror 62 may be employed as shown to redirect the beam reflected by mirror $M_{2a}'$. The latter is spherical, having a center at the Ebert circle center 63, and its radius equals $\sqrt{2}\,\rho$, where $\rho$ equals the radius of the Ebert circle. This configuration enables utilizing a "straight" detector (i.e., the straight or linear aperture of the detector) despite the marked curvature of slit $S_2$ with no loss of sensitivity due to image curvature mismatch. Alternatively, if desired, the slit cell 61 could be located at the horizontal slit image point to allow a smaller cell to be use, in case the sample area or volume is limited. Notice the 45° off-axis angularity of mirror $M_{2a}'$. The same arrangement may be employed in FIG. 1, if desired, as schematically indicated by block 64.

Figure 9:
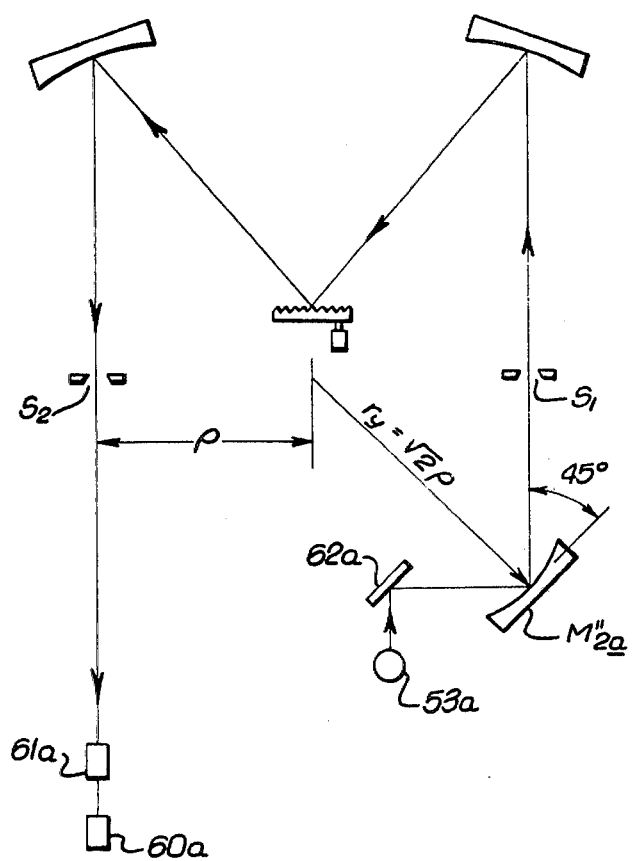
FIG. 9 is a schematic elevation showing a single monochromator with external optics coupling the entrance slit with a light source.

FIG. 9 is the same as FIG. 8, but the position of the source, detector and sample cell are reversed, these elements indicated in FIG. 9, by the numerals 53a, 60a and 61a, respectively. Also, the coupling optics spherical mirror is here designated as $M_{2a}''$, and the flat mirror as 62a. This arrangement enables a "straight" source (i.e. the linear aperture of the light source) to be imaged in entrance slit $S_1$, at the correct curvature for that slit. The same arrangement may be employed in FIG. 1, if desired, as indicated by block 65. In each of FIGS. 8 and 9, a vertical image of the aperture stop (grating) and a straight horizontal image of the slit stop, is located at the position of the source, cell or detector as the case may be.

The invention is also applicable to a subtractive version of a double monochromator, an example of which is seen in FIGS. 10–12. As there illustrated, jaws 110 and 111 define an entrance slit $S_1$, jaws 112 and 113 define intermediate slit $S_2$, and jaws 114 and 115 define exit slit $S_3$. Such structure may be considered as defining successive sections of a double monochromator operable to isolate a band of wavelengths with high and low limits. See in this regard, U.S. Pat. No. 3,748,040 to Roland C. Hawes.

The illustrated monochromator further includes beam reflecting means, as for example may take the form of spherical collimating mirror 116, in the beam path between the entrance and exit slits. Also beam dispersing means, as for example single plane grating 117, extends in the beam path between the entrance and intermediate slits, and in the beam path between the intermediate and exit slits. Further, that grating is characterized by opposed directions of dispersion in the successive monochromator sections, the first of which is associated with the beam path between $S_1$ and $S_2$, and the second of which is associated with the beam path between $S_2$ and $S_3$. The complete beam path is shown in principal ray form as including ray 115 passing from $S_1$ to the mirror for reflection at 118, ray 115b passing from the mirror to the grating for dispersion, ray 115c passing from the grating to the mirror 116 for reflection at 119, ray 115d extending from the mirror to the diagonal Newtonian mirror $N_1$ for reflection at 120, ray 115e extending from mirror $N_1$ through slit $S_2$ and to diagonal Newtonian mirror $N_2$ for reflection at 121, ray 115f extending from mirror $N_2$ to the mirror 116 for reflection as ray 115g returning to the grating 117 and ray 115h extending from the grating to the mirror for reflection as ray 115i passing through slit $S_3$. In this regard, rays 115a–115d, and a part of ray 115e extending from mirror $N_1$ to the plane of the intermediate slit $S_2$, may be considered as first pass rays, while rays which include the remainder of 115e and 115f–115i may be considered as second pass rays. Such a double pass monochromator is further characterized by symmetry and cancellation of optical aberrations.

FIG. 12 shows schematically a ray 115' emanating as fluorescence radiation from a liquid specimen 124 on which light 25 is incident. The latter originates at source 126 (which may be a laser) and psses through optical elements 127 which may include a quarter wave retarder and an electro-optic modulator, as described in copending application Ser. No. 192,815 by Ahmad Abu-Shumays and Jack J. Duffield and entitled "Linear Polarization Apparatus For Use in Circular Dichroism Polarimetry", now U.S. Pat. No. 3,741,660. The radiation exiting from the monochromator and shown schematically as ray 115i passes to a photodetector and associated electronics and recording mechanism indicated at 128, and described in U.S. Pat. No. 3,013,194 to H. H. Cary. A rotating beam chopper 70 proximate slit $S_2$ may be used to prevent detection of light scattered toward the exit slit on the first pass through the monochromator, by providing for A.C. detection, as described in U.S. Pat. No. 2,652,742 to A. Walsh.

One jaw of the intermediate slit $S_2$ is made independently adjustable to increase and decrease the width of the transmitted radiation band; and, typically only the long wavelength limit of the band is so adjustable.

Block 130 in the path of ray or beam 115j is similar to block 64 in FIG. 1, in that it represents coupling optics as described in FIG. 8; similarly, block 131 in the path of ray or beam 115 corresponds to block 65 in FIG. 1, in that it represents couling optics as described in FIG. 9.

Figure 13:
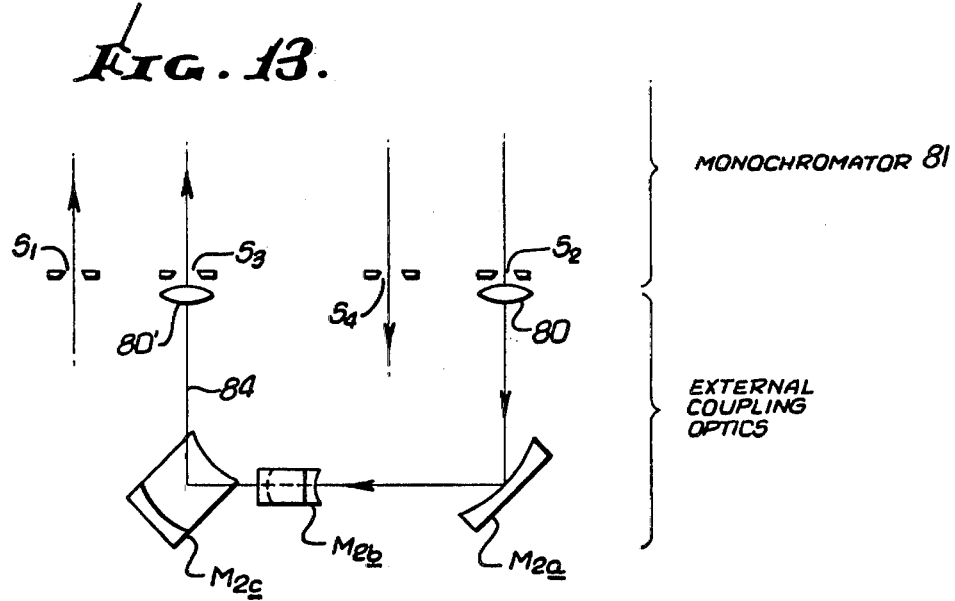
FIG. 13 is a view of a portion of FIG. 1, with an added field lens.

Finally, FIG. 13 illustrates the provision of cylindrical field lenses 80 and 80' at intermediate slits $S_2$ and $S_3$ of a monochromator like that in FIG. 1. Lenses 80 and 80' are large enough to accept the full beam 84 when the slit is at full width. They render the aperture stops in successive sections of the monochromator optically conjugate, to minimize vignetting.

In FIG. 14, $M_0$ has the same function in "straightening" the slit $S_1$ as $M_{2a}'$ has in FIG. 8 or $M_{2a}''$ has in FIG. 9. The radius $R_1$ of spherical mirror $M_0$ equals $\sqrt{2}\,\rho_1$ where $\rho_1$ is the radius of the Ebert circle for monochromator No. 1. Also, the following dimensional relationship is characteristic: $a_1 = b_1 + c_1 = \rho_1$ Regarding the coupling optics, the radius $R_2$ of the spherical mirror $M_{2a}'''$ is $R_2 = \sqrt{2}\,\rho_1$, and the radius of the spherical mirror $M_{2c}'''$ is $R_3 = \sqrt{2}\,\rho_2$, where $\rho_2$ is the radius of the Ebert circle for monochromator No. 2.

Regarding the second monochromator, the spherical mirror $M_0'$ has a radius of curvature $R_4 = \sqrt{2}\,\rho_2$, and the following dimensional relationship exists: $a_2 = b_2 + c_2 = \rho_2$. Finally, the centers of curvature of all the spherical mirrors are placed so that the rays fall on each mirror at an incidence angle of 45°. Note that the centers of curvature 217 and 218 for the radii $R_1$ and $R_4$ need not, and do not, lie on the centers of the Ebert circles associated with the slits of the two monochromators.

FIG. 15 shows another optics configuration for coupling two monochromators, as indicated. The ray exiting from slit $S_2$ of monochromator No. 1 is first reflected by spherical mirror $M_{2a}^{IV}$ then travels perpendicularly to the plane of the Figure for reflection by cylindrical mirror $M_{2b}^{IV}$ and then travels to spherical mirror $M_{2c}^{IV}$ for reflection toward flat mirror 211. The ray reflected from the latter enters monochromator No. 2 via slit $S_3$. Note that the ray distance from slit $S_2$ of monochromator $M_{2a}$ is indicated as having a dimension $\rho_1$ (the radius of the Ebert circle for monochromator No 1.) Also, the ray perpendicular to the plane of FIG. 15 and passing between $M_{2a}^{IV}$ and $M_{2b}^{IV}$ also must have the length $\rho_1$. The ray distance $\rho_2$ from $M_{2b}^{IV}$ to $M_{2c}^{IV}$ (equal to the radius of the Ebert circle for monochromator No. 2) is also equal to the dimensional sum $a_2 + b_2$, where $a_2$ is the ray distance from $M_{2c}^{IV}$ to mirror 211, and $b_2$ is the ray distance from 211 to $S_3$ of monochromator No. 2.

I claim:
1. In combination with a monochromator comprising
   a. means forming an entrance slits $S_1$ to receive a light beam from a source, and an exit slit $S_2$, said slits having curvature defining an Ebert circle,
   b. dispersing means in the beam path between the slits $S_1$ and $S_2$, and
   c. mirror means to reflect the beam for passage between slits $S_1$ and $S_2$ via the dispersing means,
   d. the improvement comprising coupling optical means including a spherical mirror located in the beam path between the source and slit $S_1$ for imaging $S_1$ onto the source, the center of said mirror located at the center of said circle,
   e. said spherical mirror having a radius of equal to $\sqrt{2}\,\rho$, where $\rho$ equals the radius of said circle.
2. The combination of claim 1 wherein the dispersing means has first and second portions, and including an adjustable third slit located in the beam path between said first and second portions of said dispersing means.
3. In combination with a monochromator comprising
   a. means forming an entrance slit $S_1$ to receive a light beam from a source, and an exit slit $S_2$, said slits having curvature defining an Ebert circle,
   b. dispersing means in the beam path between slits $S_1$ and $S_2$, and
   c. mirror means to reflect the beam for passage between slits $S_1$ and $S_2$ via the dispersing means,
   d. the combination comprising a detector and coupling means including a spherical mirror located in the beam path between slit $S_2$ and the detector for imaging slit $S_2$ onto said detector, the center of said mirror located at the center of said circle.
4. The combination of claim 3 wherein said spherical mirror has a radius equal to $\sqrt{2}\,\rho$, where $\rho$ equals the radius of said circle.

5. The combination of claim 3 wherein the dispersing means has first and second portions, and including an adjustable third slit located in the beam path between said first and second portions of said dispersing means.

6. In combination with a monchromator comprising
   a. means forming an entrance slit $S_1$ to receive a light beam from a source, and an exit slit $S_2$, said slits having curvature defining a circle,
   b. dispersing means in the beam path between slits $S_1$ and $S_2$, and
   c. mirror means to reflect the beam for passage between slits $S_1$ and $S_2$ via the dispersing means,
   d. the combination comprising a sample cell, and coupling optical means including a spherical mirror located in the beam path between slit $S_2$ and the sample cell for imaging slit $S_2$ onto said sample cell, the center of said mirror located at the center of said circle.

7. The monochromator of claim 6 wherein each of said spherical mirrors has a radius equal to $\sqrt{2}\,\rho$, where $\rho$ equals the radius of said circle.

8. The combination of claim 6 wherein the dispersing means has first and second portions, and including an adjustable third slit in the beam path between said first and second portions of said dispersing means.

* * * * *

Disclaimer and Dedication

4,017,185.—*Vernon L. Chupp,* Los Altos, Calif. OPTICAL ARRANGEMENTS FOR COUPLING MONOCHROMATORS WITH EXTERNAL SYSTEMS. Patent dated Apr. 12, 1977. Disclaimer and Dedication filed Jan. 21, 1981, by the assignee, *Varian Associates, Inc.*

Hereby disclaims and dedicates to the Public all claims of said patent.
[*Official Gazette May 12, 1981.*]